Jan. 12, 1943.  K. C. D. HICKMAN  2,308,008
HIGH VACUUM DISTILLATION APPARATUS
Filed Jan. 21, 1942  2 Sheets-Sheet 1
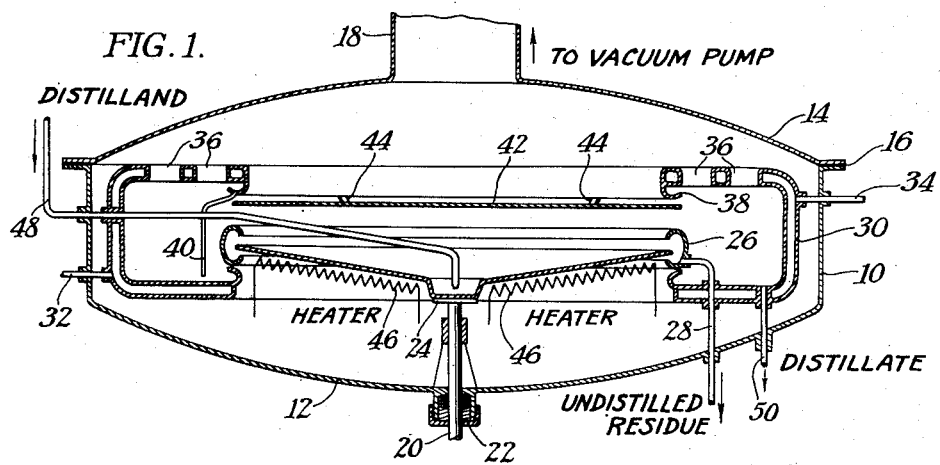
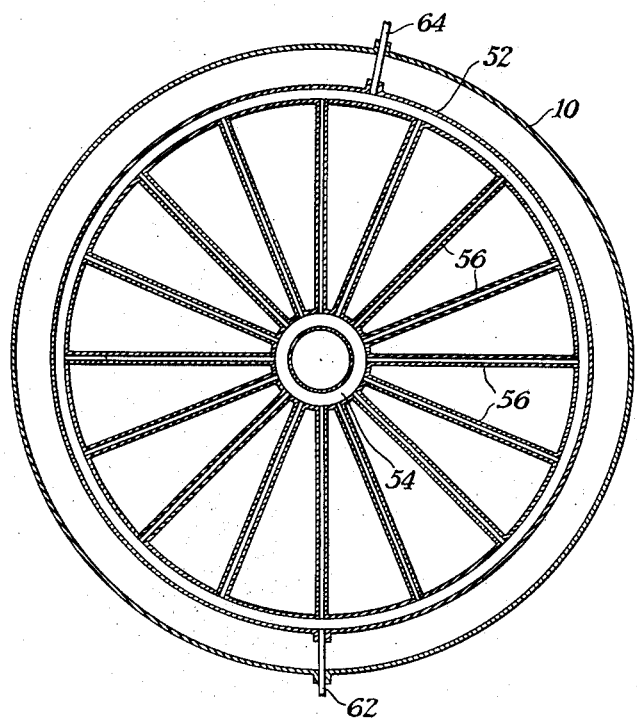
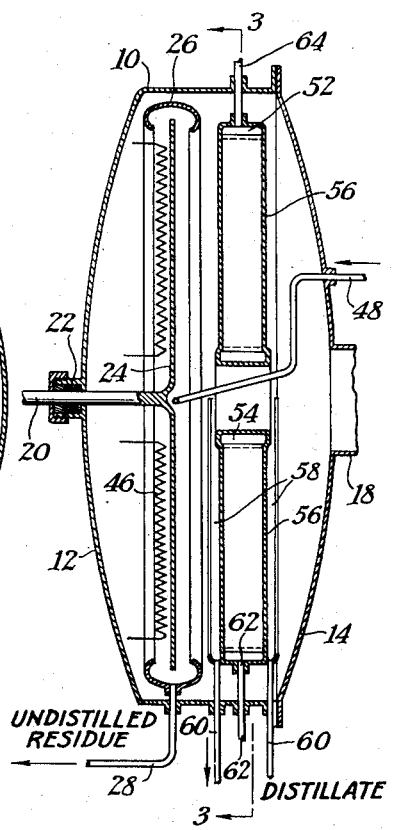
KENNETH C. D. HICKMAN
INVENTOR
BY
ATTORNEYS

KENNETH C. D. HICKMAN
INVENTOR

BY
ATTORNEYS

Patented Jan. 12, 1943

2,308,008

UNITED STATES PATENT OFFICE 2,308,008

HIGH VACUUM DISTILLATION APPARATUS

Kenneth C. D. Hickman, Rochester, N. Y., assignor to Distillation Products, Inc., Rochester, N. Y., a corporation of Delaware Application January 21, 1942, Serial No. 427,618
In Great Britain February 1, 1941

6 Claims. (Cl. 202—205)

This invention relates to improved vacuum distillation apparatus, and particularly such process and apparatus wherein the distilland is caused to flow by centrifugal force over a rotating vaporizing surface.

In my Patent 2,210,927, August 13, 1940, I have described improved distillation apparatus wherein the vaporizing and condensing surfaces are separated by space which is substantially unobstructed and the distilland is caused to flow over the vaporizing surface in a thin film by centrifugal force. Such stills will hereinafter be referred to as centrifugal stills.

Ordinarily when a mixture of substances evaporates from an evaporating surface, the thermal velocity of the vapor molecules is inversely proportional to the square root of the molecular weight; i. e., the large molecules travel more slowly than the small. Also, the vapors do not have any particular directional component; on the contrary their motion is at random and is caused by their thermal velocity.

I have found that when a mixture is vaporized on the vaporizing surface of a centrifugal still, the vapors have imparted to them a centrifugal velocity which is greater than the velocity of all but the momentarily "hottest" of molecules. My invention, therefore, includes vacuum distillation process and apparatus wherein the distilland is heated in a thin film on a centrifugal vaporizing surface and vapors which receive an additional velocity, namely centrifugal velocity, are condensed upon a condensing surface so positioned that the centrifugal velocity of these vapors causes them to pass to and impinge upon it. This results in a more efficient transfer of vapors which is of exceeding importance in vacuum distillation. Also the artificial volatility will be found useful for improving the separation of the constituents being distilled. The necessity of having a cold condensing surface opposite a hot, vaporizing surface and accompanying heat losses are avoided.

In the following description I have given several of the preferred embodiments of my invention. However, it is to be understood that these are given for the purpose of illustration and not in limitation thereof.

In the accompanying drawings wherein like numbers refer to like parts, I have illustrated several stills embodying the principles of my invention.

Referring to the drawings,

Fig. 1 is a vertical section of a still having a horizontal centrifugal vaporizing surface and a condensing surface located at the periphery thereof;

Fig. 2 is a vertical section of a centrifugal still having a vertical rotating vaporizing surface and a condensing surface located opposite thereto and composed of a series of vanes at right angles to the vaporizing surface;

Fig. 3 is a vertical section taken on line 3—3 of Fig. 2;

Figure 4:
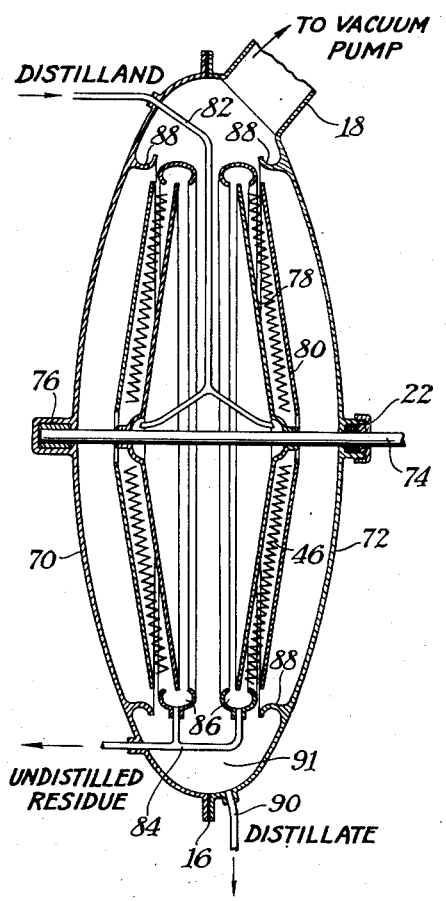
Fig. 4 is a vertical section of a still provided with two substantially parallel vertical rotating vaporizing surfaces with a condensing surface located at the periphery thereof.

Referring to Fig. 1, numeral 10 designates a cylindrical still casing provided with end plate 12 and detachable top 14 which makes gas tight contact with casing 10 by means of gasket 16. Numeral 18 designates a conduit which leads to an evacuating pump (not shown). Numeral 20 designates a rotatable shaft which is rigidly held in a gas tight manner and in the position shown by packed gland 22. Numeral 24 designates a circular plate integral with shaft 20, and numeral 26 designates an annular gutter which surrounds the periphery of plate 24. Numeral 28 designates a conduit communicating with the lower part of gutter 26 and serving to withdraw liquid therefrom. Numeral 30 designates an annular gutter having a "U-shaped" cross section, and which is double walled to permit the circulation of cooling fluid by introduction through conduit 32 and withdrawal through conduit 34. Numeral 36 designates a plurality of openings in the upper horizontal portion of annular collar or gutter 30, and numeral 38 designates a small gutter located on the inside upper edge of collar 30, to which is connected conduit 40 for withdrawing liquid therefrom and delivering it to the lower or bottom edge of collar 30. Numeral 42 designates a circular plate which is located approximately parallel and opposite to circular plate 24. Numeral 46 designates heating coils which heat rotating plate 24 to distillation temperature. Numeral 48 designates a conduit for introducing distilland onto the approximate center of vaporizing plate 24. Numeral 50 designates a conduit for withdrawing condensate from "U-shaped" annular collar member 30.

Referring to Figs. 2 and 3, numeral 52 designates a double walled annular member, a numeral 54 a similar double walled member of smaller diameter located approximately concentric with 52. Between these two members are a plurality of interconnecting double walled members 56, similar to the spokes in a wheel, which are hollow and which have an oblong cross section. Numeral 58 designates an extension of the edge of 52 which is turned upward and which is mounted upon the lower half of double wall member 52. Numeral 60 designates a conduit which communicates with the lowest portion of upward-turned edge 58 and which serves to withdraw liquid therefrom. Numeral 62 designates a conduit for introducing cooling fluid into the space between the two walls of the annular member 52, and numeral 64 designates a conduit for withdrawing cooling liquid from the space between the two walls of 52. This liquid passes through the various cooling members 56 which are at approximately right angles to the surface 24, and which act as condensing surfaces.

Referring to Fig. 4, numerals 70 and 72 designate the two halves of a circular still casing. Numeral 74 designates a shaft rigidly held in the position shown by packed gland 22, and bearing 76. Upon this shaft are mounted two circular plates 78, which during operation, are heated to vaporizing temperature by heaters 46. Numeral 80 designates circular plates of brightly polished metal which serve to reflect the heat from heaters 46 toward the vaporizing plates 78. Numeral 82 designates a conduit which is branched at its lower end for introducing liquid onto the center of vaporizing plates 78. Numeral 84 designates a conduit for withdrawing liquid from annular gutters 86. Numeral 88 designates annular projections upon the inside walls of casing elements 70 and 72, and numeral 90 designates a conduit for withdrawing liquid from the lowest part of the still casing.

Figure 5:
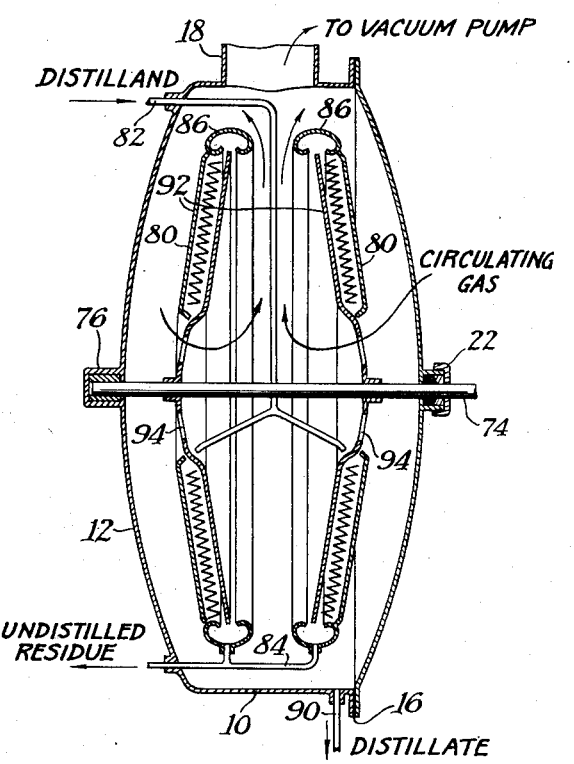
Fig. 5 is a vertical section of a still which is a modification of that shown in Fig. 4, the parallel rotating vaporizing surfaces being provided with perforations near their center to assist in the circulation of residual gas and distilling vapors.
Figure 6:
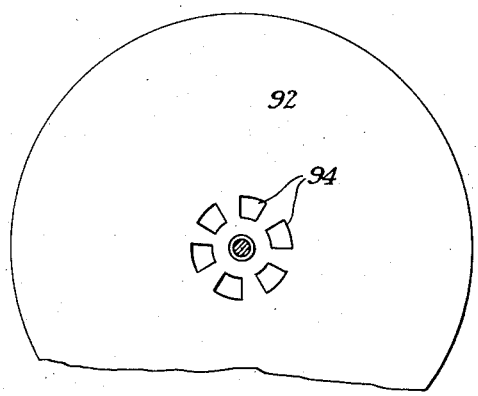
Fig. 6 is a fragmentary plan view of one of the rotating vaporizing surfaces used in the still of Fig. 5.

Referring to Figs. 5 and 6 numeral 92 designates two parallel vaporizing surfaces very similar to those illustrated in Fig. 4 with the exception that they are both provided with openings 94 near their centers.

In operating the apparatus illustrated in Fig. 1, cooling fluid is passed through the space between double walls of 30 by introducing it through conduit 32 and withdrawing through conduit 34. The still is evacuated by the pumps (not shown) connected to conduit 18. Heaters 46 are put into operation to heat the rotating surface 24 to distillation temperature. This surface is then rotated at a suitable speed by force transmitted through shaft 20. Material to be distilled is introduced through conduit 48 and onto the center of plate 24. This liquid is caused to flow at high speed and in a thin film over the surface of plate 24, to the periphery thereof, where it is flung into gutter 26. During passage over the vaporizing surface vapors are generated and due to the centrifugal velocity imparted to them at the time of vaporization, or by contact with rotating surface 24, pass at high speed into annular member 30 located at the periphery plate 24. Annular member 30 is cooled to a satisfactory condensing temperature so that the vapors flung thereto are efficiently condensed and withdrawn through conduit 50. Undistilled residue is withdrawn from gutter 26 by way of conduit 28.

Uncondensable gases generated during distillation are removed from the distilling space by way of openings 36 in collar 30 and thence by way of conduit 18. Plate 42 serves to increase the amount of vapors passing into annular member 30 by preventing their passage in other directions. However, this plate can be eliminated, if desired, in which case part of the vapors would be condensed upon the upper or top part of the still casing and the condensate could be collected by an appropriately located gutter. The other part of the vapors would be condensed in 30 as described.

In operating the apparatus shown in Figs. 2 and 3, the still is put into operation as described in connection with Fig. 1. Vapors generated from the rotating surface 24 not only have a centrifugal component toward the periphery of plate 24, but also one which is approximately at right angles to cooling vanes 56; i. e., the vapors do not pass in a straight line toward the periphery but have a spiral motion which at any particular time is approximately at right angles to vanes 56. Therefore, these vapors impinge upon the cooling vanes 56 and are condensed very efficiently. The condensate flows by gravity downward over the various elements of the condensing surface and are caught in turned edges 58 and flow thence into withdrawal conduit 60. This particular apparatus not only takes advantage of the centrifugal velocity of the vapors, but also enables one to provide wide apertures for the quick and efficient removal of non-condensable gases from the distilling space. These gases readily pass through the wide space between the vanes 56.

Referring to Fig. 4, vaporizing plates 78 are rotated at high speed by power transmitted through shaft 74 and are heated to distillation temperature by radiant heaters 46, which may be electrically or otherwise heated. The system is evacuated and distillant is introduced through conduit 82 onto the center of plates 78. Vapors which are generated are caused to flow rapidly to the periphery of plates 78 and thence into space 91 at the periphery thereof. This space is shown as air cooled and the vapors accumulating therein are condensed. The condensate runs down gutters 88 and accumulates in the base where it is withdrawn through conduit 90. More efficient condensation would take place if the condensing area 91 were provided with water-cooled surfaces, and this modification would be desirable in many cases. This apparatus functions in much the same way as that illustrated in Fig. 1, but the passage to the condensing surface at or beyond the periphery is increased by provision of two rotating surfaces parallel to each other. The vapors thus are almost 100 per cent subjected to centrifugal action and have a centrifugal velocity imparted thereto since they would collide with one or both surfaces after their formation if they did not already have a centrifugal velocity in a direction substantially toward the periphery.

In operating the apparatus illustrated in Figs. 5 and 6 rotating surfaces 92 are put into operation and heated to distillation temperature. The still is evacuated to an appropriate degree and liquid to be distilled is passed through conduit 82 onto the center of plates 92. This liquid then passes over the plates in the usual manner and is collected in gutters 86, and withdrawn through 84. Vapors generated during the passage of the distilland over rotating plates 92 pass to the periphery due to the action described in connection with Fig. 4 where they come into contact with air cooled walls of the still casing. The vapors then pass toward the center of the still casing while always being in contact with the cool casing walls. During this passage condensation takes place and the condensate is collected at the base and withdrawn through conduit 90. Noncondensable gases are accumulated at the center of the casing and are caused to flow by the centrifugal forces present, through the openings 94 into the space between the two vaporizing surfaces as illustrated by the arrows. There is thus a constant current of inert gas or residual gas which flows in a cycle from the vaporizing to the condensing surface thus producing a rapid draft of gas which helps to convey the vapors to the condensing surface. It is impossible to remove all gases from the still even with the most efficient pumps. Therefore, there is usually sufficient gas present to assist in this action. However, if desired, it may be introduced continuously into the still or permitted to accumulate therein.

While all of the figures illustrate apparatus in which heat losses are drastically reduced the apparatus illustrated in Figs. 4, 5 and 6, is particularly efficient in this respect. Here the vaporizing surface is opposite to another hot surface so that radiation losses are avoided almost entirely. The use of brightly polished surfaces further reduces heat losses.

The speed of rotation can be varied greatly and manifestly will depend upon the diameter of the vaporizing surface. With surfaces of large diameter such as 8 feet or 10 feet, the centrifugal velocity even at low speed will be great as compared with a small diameter plate at high speed. As a general rule, speeds between about 200 R. P. M. and 50,000 R. P. M. can be used and will give satisfactory results in that they will impart a centrifugal velocity to the vapors. The higher the speed the greater will be the centrifugal velocity of the vapors. However, mechanical difficulties prevent the use of very high speeds and for most purposes speeds of about 500 to 5000 R. P. M. will be found to be most economical.

It will be noted that in each of the drawings, apparatus is illustrated in which there is a wide, ample and largely unobstructed path for travel of the vapors from the vaporizing to the condensing surface. In the claims the expression "space which is largely free of obstruction to the flow of vapor" is intended to designate all such conditions.

What I claim is:

1. Vacuum distillation apparatus of the type in which the distilland is caused to flow over a rotating vaporizing surface by centrifugal force, and the vaporizing and condensing surfaces are separated by space which is largely free of obstruction to the flow of vapor therebetween characterized by a condensing surface which is so positioned that the centrifugal velocity imparted to the vapor causes them to pass to and impinge upon the condensing surface.

2. Vacuum distillation apparatus of the type in which distilland is caused to flow over a circular rotating vaporizing surface by centrifugal force, and the vaporizing and condensing surfaces are separated by space which is largely free of obstruction to the flow of vapor therebetween, characterized by a condensing surface which is so positioned that the centrifugal velocity imparted to the vapors causes them to pass to and impinge upon the condensing surface.

3. The apparatus defined in claim 2 and further characterized by means for preventing vapors from passing in any direction other than the periphery of the vaporizing surface.

4. The apparatus defined in claim 2 and further characterized by apertures at the approximate center of the vaporizing surface whereby residual gas is caused to flow between the vaporizing and condensing surfaces and to assist in the conveyance of the vapors to the condensing surface.

5. High vacuum distillation apparatus of the type in which distilland is caused to flow over a rotating vaporizing surface by centrifugal force, and the vaporizing and condensing surfaces are separated by space which is largely free of obstruction to the flow of vapor therebetween, characterized by a condensing surface which is positioned at the periphery of the rotating vaporizing surface whereby the centrifugal velocity imparted to the vapors causes them to pass to the condensing surface.

6. High vacuum distillation apparatus of the type in which distilland is caused to flow over a rotating vaporizing surface by centrifugal force and the vaporizing and condensing surfaces are separated by space which is largely free of obstruction to the flow of vapor therebetween characterized by oppositely facing vaporizing surfaces and a condensing surface so positioned that the velocity imparted to the vapors from both vaporizing surfaces causes them to impinge thereupon.

KENNETH C. D. HICKMAN.